(12) United States Patent
An et al.

(10) Patent No.: US 11,050,910 B2
(45) Date of Patent: *Jun. 29, 2021

(54) CAMERA MODULE

(71) Applicant: LG INNOTEK CO., LTD., Seoul (KR)

(72) Inventors: Myoung Jin An, Seoul (KR); Chui Ho Lee, Seoul (KR); Jong Cheol Choi, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,178

(22) Filed: Oct. 8, 2019

(65) Prior Publication Data
US 2020/0045212 A1 Feb. 6, 2020

Related U.S. Application Data

(63) Continuation of application No. 15/762,967, filed as application No. PCT/KR2016/010660 on Sep. 23, 2016, now Pat. No. 10,477,085.

(30) Foreign Application Priority Data

Sep. 24, 2015 (KR) ......................... 10-2015-0135296
Sep. 24, 2015 (KR) ......................... 10-2015-0135297

(51) Int. Cl.
 H04N 5/225 (2006.01)
 G03B 17/12 (2021.01)
 G02B 7/02 (2021.01)
(52) U.S. Cl.
 CPC .......... *H04N 5/2254* (2013.01); *G02B 7/022* (2013.01); *G02B 7/025* (2013.01); *G03B 17/12* (2013.01)

(58) Field of Classification Search
 CPC ...... H04N 5/225; H04N 5/2254; G03B 17/12; G02B 7/025; G02B 7/022
 (Continued)

(56) References Cited

U.S. PATENT DOCUMENTS 4,723,833 A 2/1988 Yamada
10,477,085 B2 * 11/2019 An ....................... H04N 5/2254
 348/374

(Continued)

FOREIGN PATENT DOCUMENTS

CN 1901622 A 1/2007
CN 101361362 A 2/2009

(Continued)

OTHER PUBLICATIONS

Office Action dated Mar. 19, 2020 in Chinese Application No. 201680068290.0.

(Continued)

*Primary Examiner* — Marly S Camargo
(74) *Attorney, Agent, or Firm* — Saliwanchik, Lloyd & Eisenschenk

(57) ABSTRACT

One embodiment of a camera module includes: a lens barrel provided with at least one lens; and a lens holder having the lens barrel coupled thereto, wherein the lens barrel may have a first adhesive part formed thereon having the bottom surface thereof facing the top surface of the lens holder and adhered to the lens holder, the lens holder may have a second adhesive part formed thereon having the top surface thereof facing the bottom surface of the lens barrel and adhered to the lens barrel, and a first recessed groove having at least a portion of an adhesive deposited therein may be formed in the second adhesive part.

20 Claims, 11 Drawing Sheets

(58) Field of Classification Search
USPC .............. 348/373–376, 340, 335, 208.11; 359/811, 831, 892, 611, 704, 540; 396/347, 298, 342, 529
See application file for complete search history.

(56) References Cited

U.S. PATENT DOCUMENTS

| | | |
|---|---|---|
| 2003/0011902 A1 | 1/2003 | Nishimura et al. |
| 2011/0026144 A1 | 2/2011 | Shyu et al. |
| 2011/0194023 A1 | 8/2011 | Tam et al. |
| 2012/0200946 A1 | 8/2012 | Wippermann et al. |
| 2015/0138436 A1 | 5/2015 | Wong |
| 2015/0156381 A1 | 6/2015 | Oba |
| 2017/0017056 A1 | 1/2017 | Park et al. |
| 2018/0120586 A1 | 5/2018 | Kim |

FOREIGN PATENT DOCUMENTS

| | | | |
|---|---|---|---|
| CN | 104487882 A | 4/2015 | |
| CN | 104969108 A | 10/2015 | |
| DE | 35 25 813 A1 | 2/1986 | |
| EP | 3 346 692 A1 | 7/2018 | |
| JP | 2002-303773 A | 10/2002 | |
| JP | 2007-036393 A | 2/2007 | |
| JP | 2007-101737 A | 4/2007 | |
| JP | 2007036393 * | 8/2007 | ............. H04N 5/225 |
| JP | 2009-181084 A | 8/2009 | |
| JP | 2015-031926 A | 2/2015 | |
| KR | 10-2008-0037783 A | 5/2008 | |
| KR | 10-2010-0100063 A | 9/2010 | |
| KR | 10-2014-0081233 A | 7/2014 | |

OTHER PUBLICATIONS

International Search Report in International Application No. PCT/KR2016/010660, filed Sep. 23, 2016.
Supplementary European Search Report dated Aug. 28, 2018 in European Application No. 16848993.8.
Non-Final Office Action dated Mar. 8, 2019 in U.S. Appl. No. 15/762,967.
Notice of Allowance dated Jul. 3, 2019 in U.S. Appl. No. 15/762,967.
European Search Report dated Oct. 27, 2020 in European Application No. 20183159.1.

* cited by examiner

CAMERA MODULE

CROSS-REFERENCE TO RELATED APPLICATIONS

This application is a continuation of U.S. patent application Ser. No. 15/762,967, filed Mar. 23, 2018, which is the U.S. national stage application of International Patent Application No. PCT/KR2016/010660, filed Sep. 23, 2016, which claims priority to Korean Patent Application Nos. 10-2015-0135296, filed Sep. 24, 2015; and 10-2015-0135297, filed Sep. 24, 2015, the disclosures of each of which are incorporated herein by reference in their entirety.

TECHNICAL FIELD

Embodiments relate to a camera module.

BACKGROUND ART

The disclosure described in this part merely provides background information related to embodiments, and does not constitute the related art.

A camera module may be mounted in a CCTV, a vehicle, or the like. In recent years, a CCTV has been connected online to enable viewing of an image photographed by the CCTV even at a remote distance. In addition, the quality of an image photographed by the CCTV is also steadily improving.

Various types of camera modules may be mounted in a vehicle. For example, a camera module, which is capable of securing a rear view when parking a vehicle, may be mounted on the rear portion of the vehicle.

In addition, a camera module may also be used in a vehicle black box, which has recently been very useful in tracking causes and details of accidents, and the like when traffic accidents occur. In addition, there is a growing trend of using a camera module as a recognition device for clearly and easily grasping the situation in a blind spot, which is difficult for a vehicle driver or occupant to view directly.

In recent years, the production of a so-called smart car, that is, a vehicle equipped with a collision warning system, which detects the possibility of a collision at the front or rear of the vehicle in advance while the vehicle is traveling in order to prepare for such a collision, a collision avoidance system, which enables a control device mounted on the vehicle to directly avoid a collision between vehicles driven by these control devices without requiring the driver's operation, and the like is increasing, and the development of related technologies is increasing.

The use of a camera module as an external situation recognition device of such a smart car is increasing, and accordingly, the production and technical development of a vehicle camera module are also increasing.

A camera module may be assembled by coupling a lens barrel having a lens to a lens holder. Here, the lens barrel has the risk of causing damage to elements inside the camera module due to the overflow of an adhesive or the like in the process of coupling the lens holder and the lens barrel to each other. Therefore, a solution therefor is required.

When the camera module is assembled by coupling the lens barrel having the lens to the lens holder, the lens barrel may be disposed outside a designated position on the lens holder, and the allowable error range thereof, in the assembly process. In this case in particular, the focal length between the lens and an image sensor mounted in the camera module may differ from a designed value.

Therefore, there is a demand for a structure that is capable of inhibiting the lens barrel from deviating from the designed position thereof and the error range thereof when the lens barrel is assembled with the lens holder.

Technical Object

Therefore, embodiments relate to a camera module, which may inhibit or remarkably reduce damage to elements inside the camera module due to the overflow of an adhesive or the like in the process of coupling a lens barrel to a lens holder.

Further, embodiments relate to a camera module, which has a structure capable of inhibiting a lens barrel from deviating from the designed position thereof and the error range thereof when the lens barrel and a lens holder are assembled with each other.

The technical objects to be accomplished by the embodiments are not limited to the aforementioned technical object, and other unmentioned technical objects will be clearly understood from the following description by those having ordinary skill in the art.

Technical Solution

One embodiment of a camera module includes a lens barrel comprising at least one lens, and a lens holder coupled to the lens barrel, wherein the lens barrel is formed with a first adhesive portion comprising a bottom surface facing a top surface of the lens holder and attached to the lens holder, and the lens holder is formed with a second adhesive portion comprising a top surface facing a bottom surface of the lens barrel and attached to the lens barrel, and wherein the second adhesive portion is formed with a first recess, to which at least a portion of an adhesive is applied.

Another embodiment of a camera module includes a lens barrel comprising at least one lens and formed with a first screw-thread in a portion of an outer circumference thereof, and a lens holder formed with a through-hole and also formed in an inner circumference of the through-hole with a second screw-thread configured to be screwed to the first screw-thread, wherein the lens barrel and the lens holder are attached to each other by an adhesive disposed in a gap between the first screw-thread and the second screw-thread, the adhesive containing a filler.

A further embodiment of a camera module includes a lens barrel comprising at least one lens, and a lens holder coupled to the lens barrel, wherein the lens barrel is formed with a first adhesive portion comprising a bottom surface facing a top surface of the lens holder and attached to the lens holder, and the lens holder is formed with a second adhesive portion comprising a top surface facing a bottom surface of the lens barrel and attached to the lens barrel, and wherein the second adhesive portion is formed thereon with a first protrusion, and the first protrusion protrudes in a first direction.

Advantageous Effects

In the embodiments, by inhibiting an adhesive from flowing into a lens holder and an accommodating unit using a first protrusion, it is possible to inhibit contamination of a printed circuit board, various elements, and an image sensor provided in the accommodating unit. Thereby, it is possible to inhibit or remarkably reduce deterioration in the performance of a camera module due to contamination.

In addition, in the embodiments, a second adhesive portion is formed such that the height of the outer surface thereof is lower than the height of the inner surface, and an adhesive flows from the inner surface to the outer surface of the second adhesive portion. Thereby, it is possible to inhibit the adhesive from overflowing to the inner circumference of the second adhesive portion.

In the embodiments, a lens barrel is attached to the lens holder using an adhesive containing a filler. Thereby, it is possible to remarkably reduce the magnitude of displacement by which the lens barrel moves downward from the designed position thereof in the optical-axis direction due to the curing shrinkage of the adhesive and the weight of the lens barrel.

By remarkably reducing the magnitude of such displacement, the focal length between a lens and an image sensor may be maintained very similar to the designed value thereof. Thereby, it is possible to achieve an improvement in the performance of the camera module, such as an increase in the resolution of an image of a subject to be photographed.

DESCRIPTION OF DRAWINGS

FIG. 5 illustrates one embodiment in the state in which an adhesive is interposed and cured between the lens barrel and a lens holder in order to attach the same to each other.

FIG. 10 illustrates the state in which the lens barrel and the lens holder are attached to each other using an adhesive containing no filler applied thereto, unlike the embodiment.

FIG. 11 illustrates the state in which the lens barrel and the lens holder are attached to each other using an adhesive containing a filler applied thereto according to the embodiment.

BEST MODE

Figure 1:
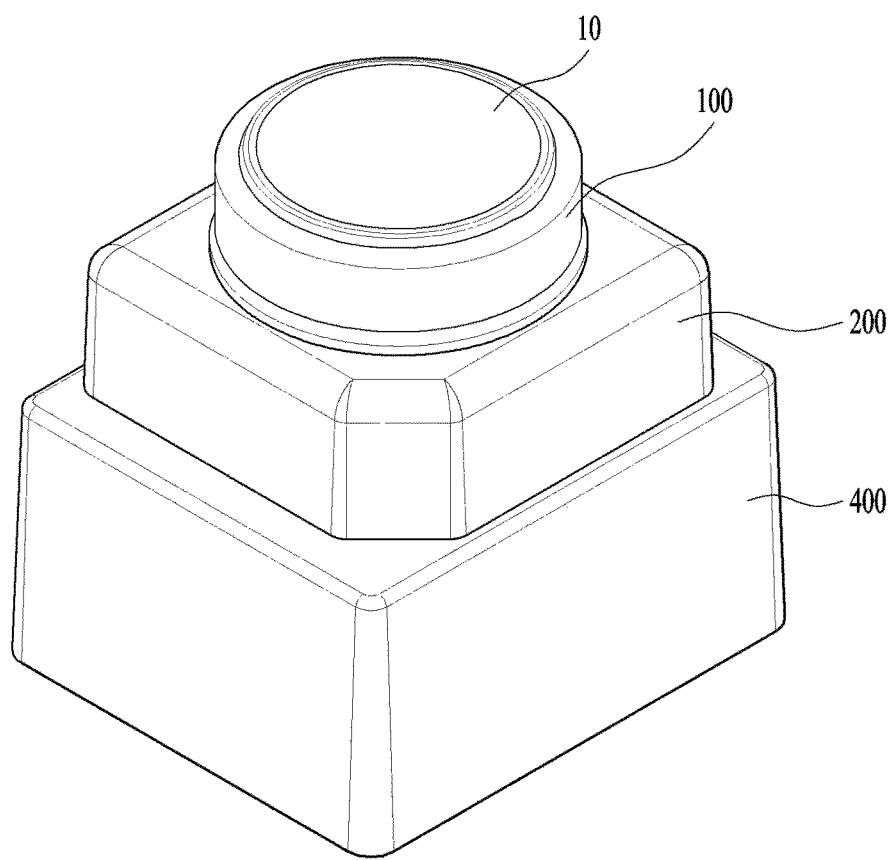
FIG. 1 is a perspective view illustrating a camera module according to one embodiment.

Hereinafter, exemplary embodiments will be described in detail with reference to the accompanying drawings. While the exemplary embodiments are susceptible to various modifications and alternative forms, specific embodiments thereof are shown by way of example in the drawings and will herein be described in detail. It should be understood, however, that there is no intent to limit the embodiments to the particular forms disclosed, but on the contrary, the embodiments should be construed as including all modifications, equivalents, and alternatives falling within the spirit and scope of the embodiments.

Although terms such as, for example, "first" and "second" may be used to describe various elements, the components should be not limited by these terms. These terms are merely used to distinguish the same or similar elements from each other. In addition, the terms particularly defined in consideration of configurations and operations of the embodiments are merely provided to describe the embodiments, and are not intended to limit the scope of the embodiments.

In the description of the embodiments, when an element is referred to as being formed "on" or "under" another element, it can be directly "on" or "under" the other element or be indirectly formed with intervening elements therebetween. It will also be understood that "on" or "under" the element may be described relative to the drawings.

In addition, relative terms such as, for example, "on/upper/above" and "beneath/lower/below", used in the following description may be used to distinguish any one substance or element with another substance or element without requiring or containing any physical or logical relationship or sequence between these substances or elements.

In addition, in the drawings, the orthogonal coordinate system (x, y, z) may be used in the drawings. In the drawings, the x-axis and the y-axis indicate planes orthogonal to the optical axis, and for convenience, the optical-axis direction (the z-axis) is referred to as a first direction, the x-axis is referred to as a second direction, and the y-axis is referred to as a third direction.

FIG. 1 is a perspective view illustrating a camera module according to one embodiment. As illustrated in FIG. 1, the camera module according to the embodiment may include a lens barrel 100, a lens holder 200, and an accommodating unit 400.

The lens barrel 100 may include at least one lens 10, and may serve to couple the lens 10 to the lens holder 200. The lens barrel 100 may be coupled to a through-hole formed in the lens holder 200 in various ways.

For example, a female screw-thread may be formed in the inner circumference of the through-hole in the lens holder 200, and a male screw-thread may be formed in the outer circumference of the lens barrel 100 so as to correspond to the female screw-thread in the lens holder 200, whereby the lens barrel 100 may be coupled to the lens holder 200 via screwing of these screw-threads.

Figure 4:
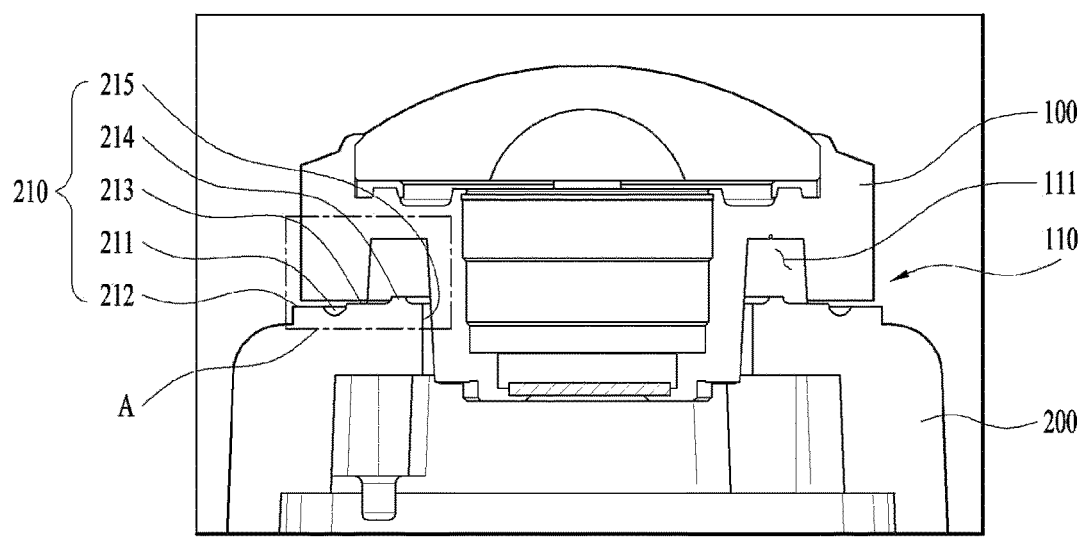
FIG. 4 is a cross-sectional view illustrating a portion of the camera module according to one embodiment.
Figure 5:
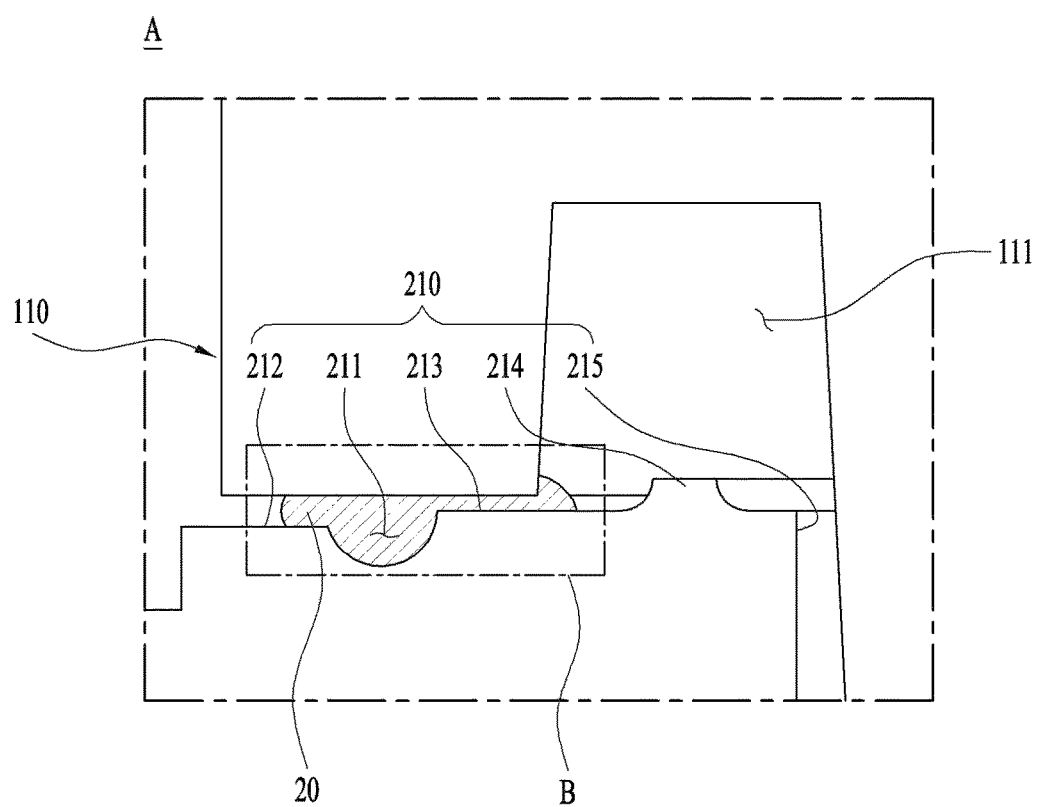
FIG. 5 is an enlarged view illustrating portion A of FIG. 4.

However, the disclosure is not limited thereto, and as in the embodiment illustrated in FIG. 4 and the like, rather than forming the screw-threads in the lens barrel 100 and the lens holder 200, the lens barrel 100 and the lens holder 200 may be attached to each other using an adhesive 20 (see FIG. 5).

Meanwhile, the lens 10 provided in the lens barrel 100, as illustrated in FIG. 4 and the like, may be configured with a lens sheet, and in another embodiment, may be configured such that two or more lenses are aligned in an optical-axis direction, i.e. in the first direction so as to constitute an optical system.

The lens holder 200 is an area to which the lens barrel 100 is coupled, and may be formed in a central portion thereof with the through-hole to allow a portion of the lens barrel 100 to be inserted therein. As described above, the lens barrel 100 and the lens holder 200 may be coupled to each other via screwing, adhesion, or the like, and may also be coupled to each other using both screwing and adhesion.

The accommodating unit 400 may be coupled to the lens holder 200, and may accommodate therein a printed circuit board, various elements, an image sensor (not illustrated) on which an image of a subject is formed, and the like. The lens holder 200 and the accommodating unit 400 may be integrally formed with each other via injection molding or the like, or may be separately manufactured and then coupled to each other via adhesion, fusion, or fastener coupling, or the like.

Figure 2:
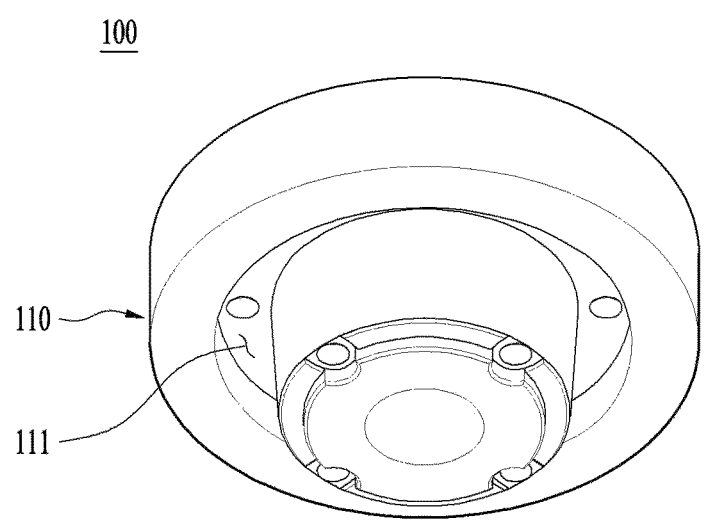
FIG. 2 is a bottom perspective view illustrating a lens barrel according to one embodiment.

FIG. 2 is a bottom perspective view illustrating the lens barrel 100 according to one embodiment. The lens barrel 100 may include a first adhesive portion 110. The first adhesive portion 110 is an area, the bottom surface of which faces the top surface of the lens holder 200, and which is attached to the lens holder 200.

Therefore, for convenience of description, the term "first adhesive portion 110" refers to a lower portion of the lens barrel 100, to which the adhesive 20 is applied, and a portion adjacent thereto. Here, the first adhesive portion 110 may have a ring shape when viewed in the first direction, and may include a second recess 111, as illustrated in FIG. 2.

The ring shape described above and a ring shape to be described below may include not only a ring shape that is completely connected in a single closed curve, but also a shape that approximates a ring shape, but is broken at a portion thereof. For example, any shape may appear as a ring shape so long as it approximates a ring shape overall because broken areas thereof are regularly distributed or because it has consistent bends, curvatures, or the like.

The second recess 111 may be formed inside the first adhesive portion 110, and may have a ring shape when viewed in the first direction. Therefore, the first adhesive portion 110 is an area that includes the second recess 111 and the outer area thereof.

The second recess 111 may serve to inhibit or remarkably reduce the generation of defects due to excessive deformation, breakage, and the like in the process of manufacturing the lens barrel 100 and the first adhesive portion 110.

In addition, when the lens barrel 100 and the lens holder 200 are coupled to each other using the adhesive 20, the second recess 111 may serve to provide a space in which a first protrusion 214 formed on the lens holder 200 may be disposed without interfering with the lens barrel 100.

The second recess 111 may be formed by injection molding, or may be formed by cutting the area inside the first adhesive portion 110 using a processing tool. In particular, when the lens barrel 100 is formed of a metal material, formation by cutting using the processing tool may be easier.

Meanwhile, a filter (not illustrated) may be coupled or disposed under the lens barrel 100. The filter may be disposed under the lens barrel 100 so as to face the lens 10 and to be spaced apart from the lens 10 in the first direction.

The filter may serve to inhibit light within a particular frequency band, among light passing through the lens 10, from being incident on an image sensor (not illustrated), which is disposed under the filter so as to face the filter and to be spaced apart from the filter in the first direction. In one embodiment, the filter may be an infrared-light-blocking filter.

That is, the light incident on the lens 10 passes through the lens 10 and the filter and reaches the top surface of the image sensor such that an image of a subject included in the incident light may be formed on the top surface of the image sensor.

The filter may be coupled to the lens barrel 100 in one embodiment, as illustrated in FIG. 2, but may be disposed under the lens barrel 100 so as to face the lens barrel 100 and to be spaced apart from the lens barrel 100 in the first direction.

Figure 3:
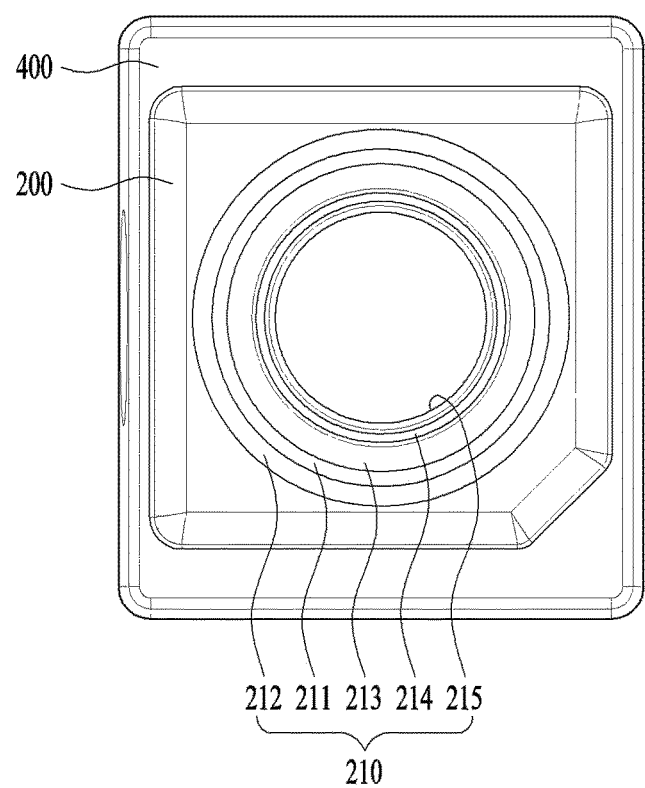
FIG. 3 is a plan view illustrating the state in which the lens barrel is removed from the camera module according to one embodiment.

FIG. 3 is a plan view illustrating the state in which the lens barrel 100 is removed from the camera module according to one embodiment. FIG. 4 is a cross-sectional view illustrating a portion of the camera module according to one embodiment.

The lens holder 200 may include a second adhesive portion 210. The second adhesive portion 210 is an area, the top surface of which faces the bottom surface of the lens barrel 100, and which is attached to the lens barrel 100.

That is, for convenience of description, the term "second adhesive portion 210" refers to a portion of the top surface of the lens holder 200 to which the adhesive 20 is applied and a portion adjacent thereto. Here, the second adhesive portion 210 may have a ring shape when viewed in the first direction.

As illustrated in FIGS. 3 and 4, the second adhesive portion 210 may include a first recess 211, an outer surface 212, an inner surface 213, and the first protrusion 214. Here, as illustrated in FIG. 5, the distance from the outer circumference of the second adhesive portion 210 to the inner circumference 215 of the second adhesive portion 210 may be defined as the width L of the second adhesive portion 210.

The first recess 211 may be formed between the outer surface 212 and the inner surface 213, and may have a ring shape in the circumferential direction of the second adhesive portion 210. At least some of the adhesive 20 may be applied to the first recess 211.

The first recess 211 may inhibit the adhesive 20 from flowing down to the outer circumference or the inner circumference 215 of the second adhesive portion 210, and may serve to increase the adhesion surface area of the second adhesive portion 210, thereby increasing the coupling strength of the lens barrel 100 and the lens holder 200 using the adhesive 20.

The outer surface 212 means the top surface of the second adhesive portion 210 that is present outside the first recess 211, and the inner surface 213 means the top surface of the second adhesive portion 210 that is present inside the first recess 211. Here, the adhesive 20 may be applied to at least a portion of the inner surface 213 and the outer surface 212 so as to be attached to the bottom surface of the first adhesive portion 110.

However, in order to inhibit the adhesive 20 from flowing down to the outer circumference or the inner circumference 215 of the second adhesive portion 210, it may be appropriate for the adhesive 20 to be applied only to a portion of the outer circumference and the inner circumference 215 of the second adhesive portion 210.

The first protrusion 214 may protrude from the inner surface 213 in the first direction, and may be formed at a position spaced apart from the first indention 211. Here, the first protrusion 214 may be provided in a ring shape along the circumferential direction of the second adhesive portion 210.

The first protrusion 214 may serve to inhibit the adhesive 20, applied to the first adhesive portion 110 and the second adhesive portion 210, from overflowing to the inner circumference 215 of the second adhesive portion 210. When the adhesive 20 overflows to the inner circumference 215 of the second adhesive portion 210, a serious problem may occur.

For example, when the adhesive 20 overflows to the inner circumference 215 of the second adhesive portion 210, and flows to the accommodating unit 400 through a hollow region of the lens holder 200, the printed circuit board, various elements, and the like provided in the accommodating unit 400 may be contaminated, which may cause deterioration in performance and problems with operation thereof.

In particular, when the image sensor accommodated in the accommodating unit 400 is contaminated by the adhesive 20, malfunction, breakage, or the like of the image sensor may occur, which may cause serious deterioration in the quality of an image photographed by the camera module.

Therefore, in the embodiment, the first protrusion 214 may be provided to inhibit the adhesive 20 from flowing to the lens holder 200 and the accommodating unit 400 in order to inhibit contamination of the printed circuit board, various elements, and the image sensor provided in the accommodating unit 400. Thereby, it is possible to inhibit or remarkably reduce deterioration in the performance of the camera module due to such contamination.

Meanwhile, the first protrusion 214 may be formed so as to be spaced apart from the inner circumference 215 of the second adhesive portion 210 by a predetermined distance. When the lens barrel 100 and the lens holder 200 are coupled to each other, an active alignment process, i.e. a dynamic alignment process, may be performed.

In the active alignment process, the lens barrel 100 is three-dimensionally moved along the x-axis, the y-axis, and the z-axis relative to the lens holder 200, whereby the lens barrel 100 is aligned at an assembly position. In this procedure, the lens barrel 100 is moved in the first direction and/or in the second direction, i.e. in the x-y plane relative to the lens holder 200.

Therefore, in order to inhibit the first protrusion 214 from hindering the movement of the lens barrel 100 when the lens barrel 100 is moved in the x-y plane during the active alignment process, it may be appropriate for the first protrusion 214 to be spaced apart from the inner circumference 215 of the second adhesive portion 210 by a predetermined distance in the width direction of the second adhesive portion 210.

FIG. 5 is an enlarged view illustrating portion A of FIG. 4. FIG. 5 illustrates one embodiment in the state in which the adhesive 20 is interposed and cured between the lens barrel 100 and the lens holder 200 in order to attach the same to each other. Here, the adhesive 20 may use epoxy, a thermosetting adhesive, or the like.

As illustrated in FIG. 5, when the adhesive 20 is cured, it may be appropriate for the position and the amount of application of the adhesive to be adjusted so that the adhesive is present on a portion of the bottom surface of the first adhesive portion 110, a portion of the outer surface 212 of the second adhesive portion 210, and a portion of the first recess 211 and the inner surface 213.

However, even when the adhesive 20 is applied at an incorrect position, or an excessive amount of the adhesive is applied, as described above, in particular, it is necessary to inhibit the adhesive 20 from overflowing to the inner circumference 215 of the second adhesive portion 210. As one method to inhibit this, formation of the first protrusion 214 has been described above. Hereinafter, an additional prevention method will be described.

As illustrated in FIG. 5, the second adhesive portion 210 may be formed such that the height of the outer surface 212 is lower than the height of the inner surface 213. In this structure, even when the adhesive 20 is applied at an incorrect position, or an excessive amount of adhesive is applied, it is possible to inhibit the adhesive 20 from overflowing to the inner circumference 215 of the second adhesive portion 210.

That is, since the adhesive 20 flows from the inner surface 213, which is relatively high, to the outer surface 212 of the second adhesive portion 210, even when the adhesive 20 is applied at an incorrect position, or an excessive amount of the adhesive is applied, no adhesive overflows to the inner circumference 215 of the second adhesive portion 210.

Accordingly, in the embodiment, since the second adhesive portion 210 is formed such that the height of the outer surface 212 is lower than the height of the inner surface 213 in order to ensure that the adhesive 20 flows from the inner surface 213 to the outer surface 212 of the second adhesive portion 210, it is possible to inhibit the adhesive 20 from overflowing to the inner circumference 215 of the second adhesive portion 210.

The first recess is formed to have a curved cross section in FIG. 5, but this is merely one given embodiment, and the first recess may be formed to have a polygonal cross section. In addition, a plurality of first recesses may be formed in the width direction of the second adhesive portion 210.

Meanwhile, the width of the first recess 211 may be about 80% of the thickness of a needle that is used to inject epoxy.

As described above, the second recess 111 may serve to provide the space in which the first protrusion 214 formed on the lens holder 200 may be disposed without interfering with the lens barrel 100 when the lens barrel 100 and the lens holder 200 are coupled to each other by the adhesive 20.

Therefore, in order to allow the second recess 111 to provide the space in which the first protrusion 214 is disposed, as illustrated in FIG. 5, it may be appropriate for the first protrusion 214 and the second recess 111 to be provided so as to face each other in the first direction.

In order to allow the first protrusion 214 to inhibit the adhesive 20 from overflowing to the inner circumference 215 of the second adhesive portion 210, the position at which the first protrusion 214 is disposed is important. Therefore, it may be appropriate for the first protrusion 214 to be formed on the inner surface 213.

Specifically, it may be appropriate for the first protrusion 214, as illustrated in FIG. 5, to be formed on an inner area on the basis of the position on the inner surface 213 that is half the width L of the second adhesive portion 210.

The height of the first protrusion 214 may be related to the distance between the top surface of the image sensor and the upper end of the lens 10. That is, the width of the cured adhesive 20 in the first direction may be greater than the height of the first protrusion 214.

As the width of the adhesive 20 in the first direction increases, the possibility of the adhesive 20 overflowing to the inner circumference 215 of the second adhesive portion 210 increases, but the first protrusion 214 may inhibit the adhesive from overflowing to the inner circumference 215.

When the width of the adhesive 20 in the first direction increases, the focal length of the lens 10 may become different from the designed value thereof, which may deteriorate the performance of the camera module. Therefore, it may be appropriate for the height of the first protrusion 214, which corresponds to the maximum width of the adhesive 20 in the first direction, to be smaller than the tolerance corresponding to the distance between the top surface of the image sensor and the upper end of the lens 10.

For example, when the tolerance corresponding to the distance between the top surface of the image sensor and the upper end of the lens 10 is about 300 μm, it may be appropriate for the height of the first protrusion 214 to range from 100 μm to 240 μm.

Figure 6:
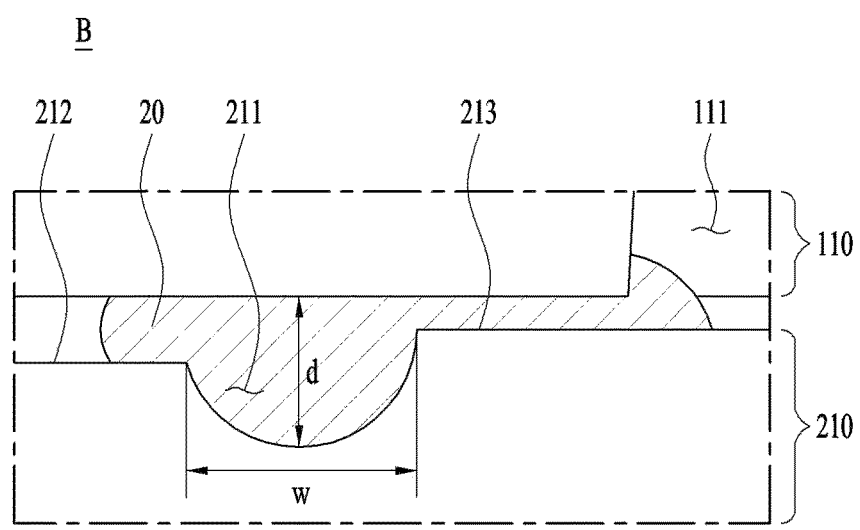
FIG. 6 is an enlarged view illustrating portion B of FIG. 5.

FIG. 6 is an enlarged view illustrating portion B of FIG. 5. A concrete embodiment related to the width w of the first recess 211 and the depth d of the first recess 211 will be described below with reference to FIG. 6.

In order to increase the cross-sectional area over which the adhesive 20 is applied and to ensure high coupling strength of the adhesive 20 applied to the first recess 211, the width w of the first recess 211 may be greater than the depth d of the first recess 211.

For example, as illustrated in FIG. 6, when the cross section of the first recess 211 has a curved shape, it may be appropriate for the maximum depth d of the first recess 211, i.e. the longest length of the first recess 211 measured in the first direction to be about half the width w of the first recess 211. In addition, a portion of the second adhesive portion 210 described above may be additionally formed with an uneven structure.

However, this is merely one given embodiment, and it may be appropriate for the ratio of the width w to the depth d of the first recess 211 to be selected in consideration of the number and the cross-sectional shape of first recess 211, the material and curing coupling strength of the adhesive 20, and the like.

Figure 7:
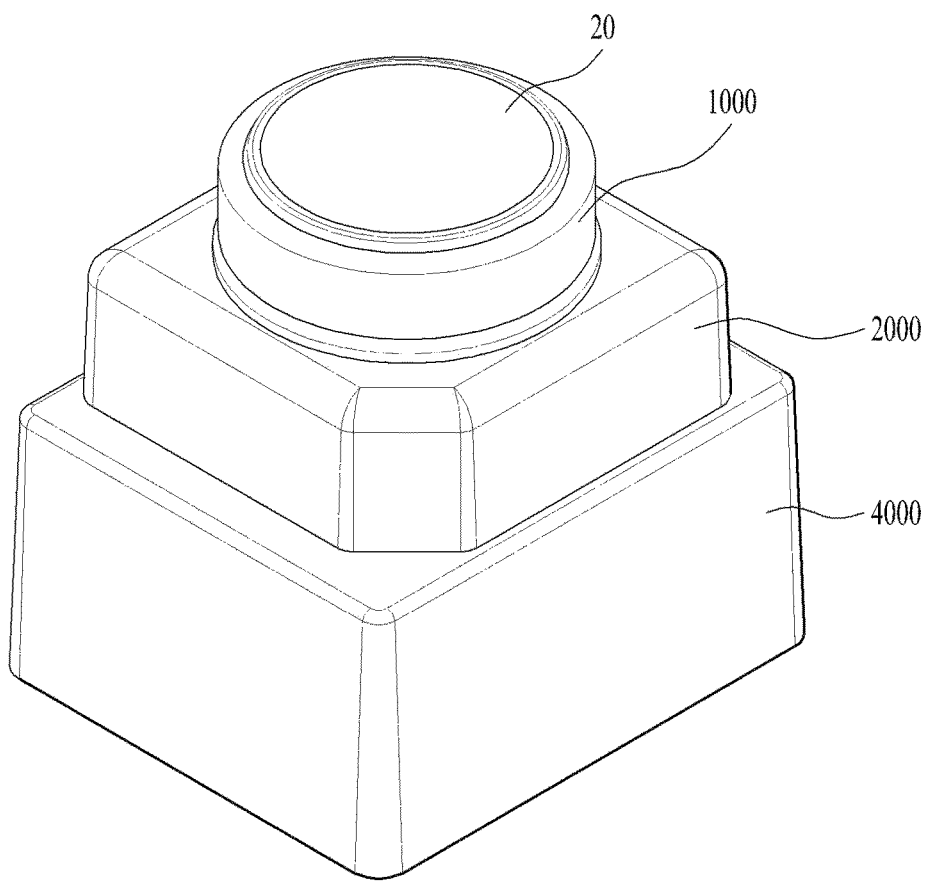
FIG. 7 is a perspective view illustrating a camera module according to another embodiment.

FIG. 7 is a perspective view illustrating a camera module according to another embodiment. As illustrated in FIG. 7, the camera module according to the embodiment may include a lens barrel 1000, a lens holder 2000, and an accommodating unit 4000.

The lens barrel 1000 may include at least one lens 20, and may serve to couple the lens 20 to the lens holder 2000. The lens barrel 1000 may be coupled to a through-hole formed in the lens holder 2000 in various ways.

For example, a female screw-thread or a male screw-thread may be formed in the inner circumference of the through-hole in the lens holder 2000, and a male screw-thread or a female screw-thread may be formed in the outer circumference of the lens barrel 1000 so as to correspond to the female screw-thread or the male screw-thread in the lens holder 2000, whereby the lens barrel 1000 may be coupled to the lens holder 2000 via screwing of these screw-threads.

However, the disclosure is not limited thereto, and rather than forming the screw-threads in the lens barrel 1000 and the lens holder 2000, the lens barrel 1000 and the lens holder 2000 may be attached to each other using an adhesive 3000.

In addition, in another embodiment, the lens barrel 1000 and the lens holder 2000 may be coupled to each other using a method in which both the above-described screwing and adhesion are combined. Hereinafter, the case in which the combined method is used according to the embodiment will be described.

Figure 8:
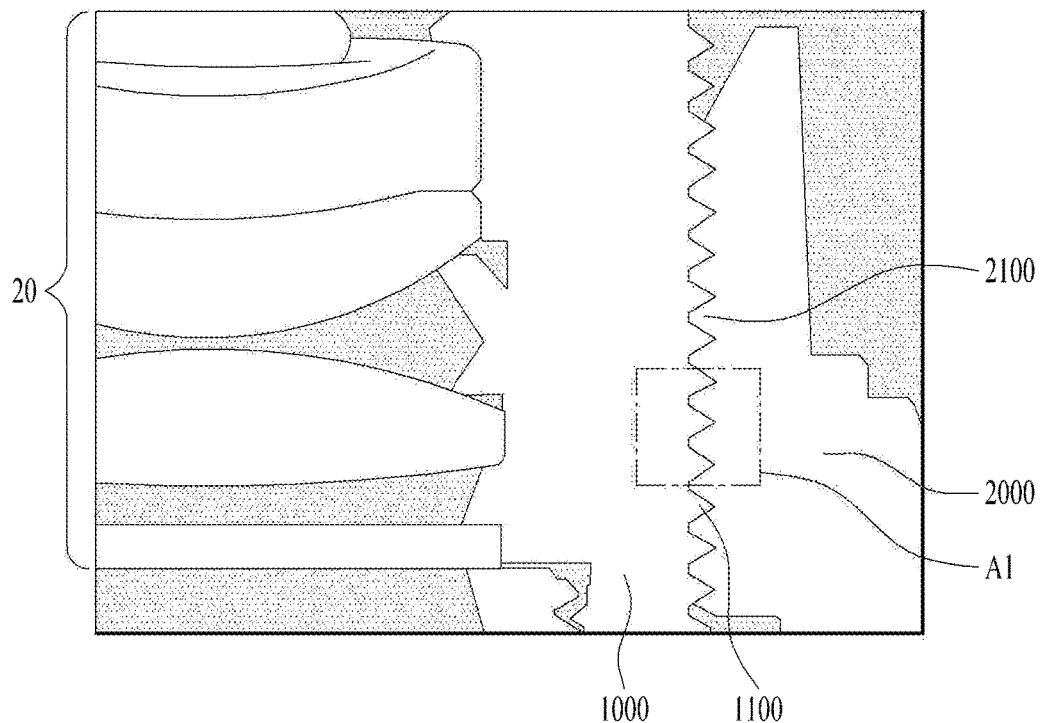
FIG. 8 is a cross-sectional view illustrating the state in which a lens barrel and a lens holder are coupled to each other according to another embodiment.

The lens 20 provided in the lens barrel 1000, as illustrated in FIG. 8, may be configured with two or more lenses 20, which are aligned in the optical-axis direction so as to constitute an optical system. In another embodiment, the lens 20 may be configured with a lens sheet.

The lens holder 2000 is an area to which the lens barrel 1000 is coupled, and may be formed in a central portion thereof with the through-hole to allow a portion of the lens barrel 1000 to be inserted therein. As described above, the lens barrel 1000 and the lens holder 2000 may be coupled to each other via screwing, adhesion, a combined method of screwing and adhesion, or the like. Hereinafter, in the embodiment, the case in which the combined method is used will be described.

The accommodating unit 4000 may be coupled to the lens holder 2000, and may accommodate therein a printed circuit board, various elements, an image sensor (not illustrated) on which an image of a subject is formed, and the like. The lens holder 2000 and the accommodating unit 4000 may be integrally formed with each other via injection molding or the like, or may be separately manufactured and then coupled to each other via adhesion, fusion, fastener coupling, or the like.

Figure 9:
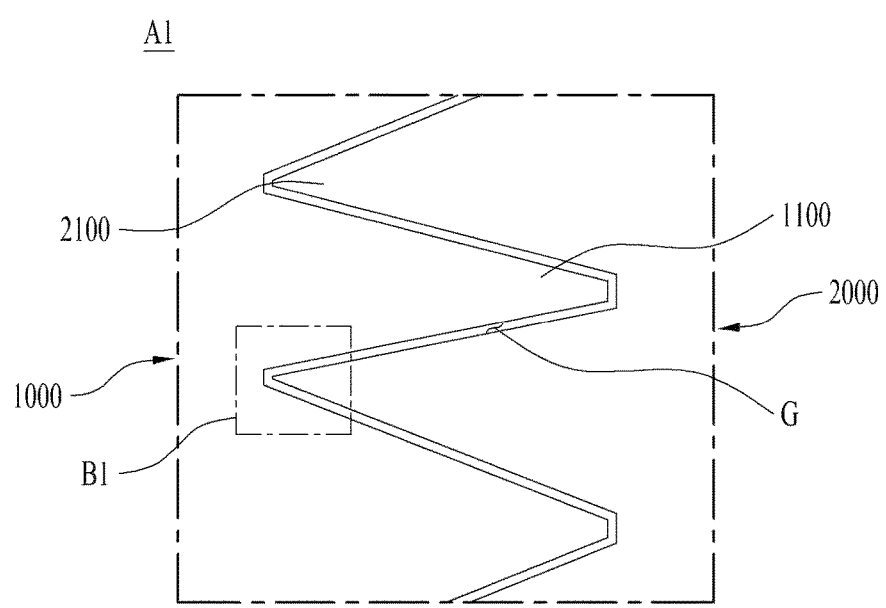
FIG. 9 is an enlarged view illustrating portion A1 of FIG. 8.

FIG. 8 is a cross-sectional view illustrating the state in which the lens barrel 1000 and the lens holder 2000 are coupled to each other according to another embodiment. FIG. 9 is an enlarged view illustrating portion A1 of FIG. 8. In the embodiment, the lens barrel 1000 and the lens holder 2000 may be coupled to each other by a combined method of screwing and adhesion.

The lens barrel 1000 may have a first screw-thread 1100 as a male screw-thread formed in a portion of the outer circumference thereof. The lens holder 2000 may have a second screw-thread 2100 as a female screw-thread formed in the inner circumference of the through-hole. Since the first screw-thread 1100 and the second screw-thread 2100 are screwed to each other, the shapes thereof may correspond to each other so as to be suitable for screwing.

When the first screw-thread 1100 and the second screw-thread 2100 are screwed to each other, a gap G may be formed. The gap G is a processing tolerance to ensure that the first screw-thread 1100 and the second screw-thread 2100 are smoothly screwed to each other.

That is, when the lens barrel 1000 and the lens holder 2000 are screwed to each other, one of the lens barrel 1000 or the lens holder 2000 is rotated to realize screwing between the first screw-thread 1100 and the second screw-thread 2100. At this time, when the first screw-thread 1100 and the second screw-thread 2100 are processed so as not to form the gap G therebetween, rotation of the lens barrel 1000 or the lens holder 2000 may be impossible or very difficult.

Figure 11:
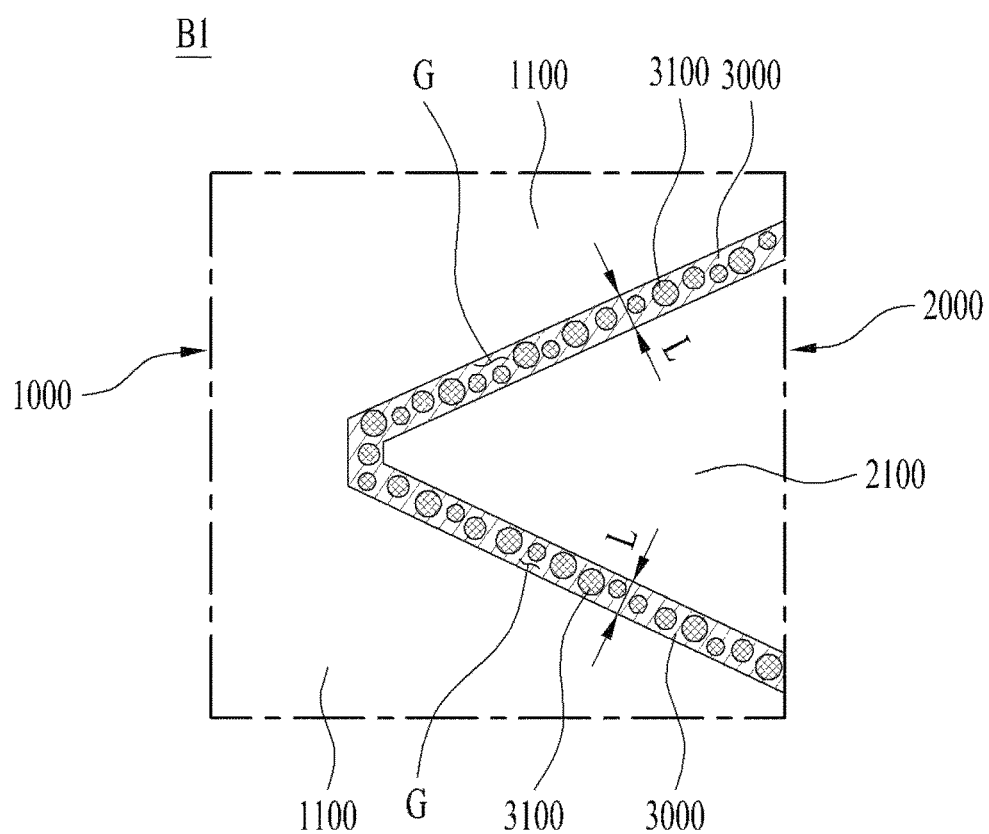
FIG. 11 is an enlarged view illustrating portion B1 of FIG. 9.

Therefore, by appropriately forming the gap G, it is possible to ensure that the first screw-thread 1100 and the second screw-thread 2100 are smoothly screwed to each other. Meanwhile, as illustrated in FIG. 11, the adhesive 3000 may be applied to the gap G in order to attach the first screw-thread 1100 and the second screw-thread 2100 to each other, thereby achieving stronger coupling of the lens barrel 1000 and the lens holder 2000.

Figure 10:
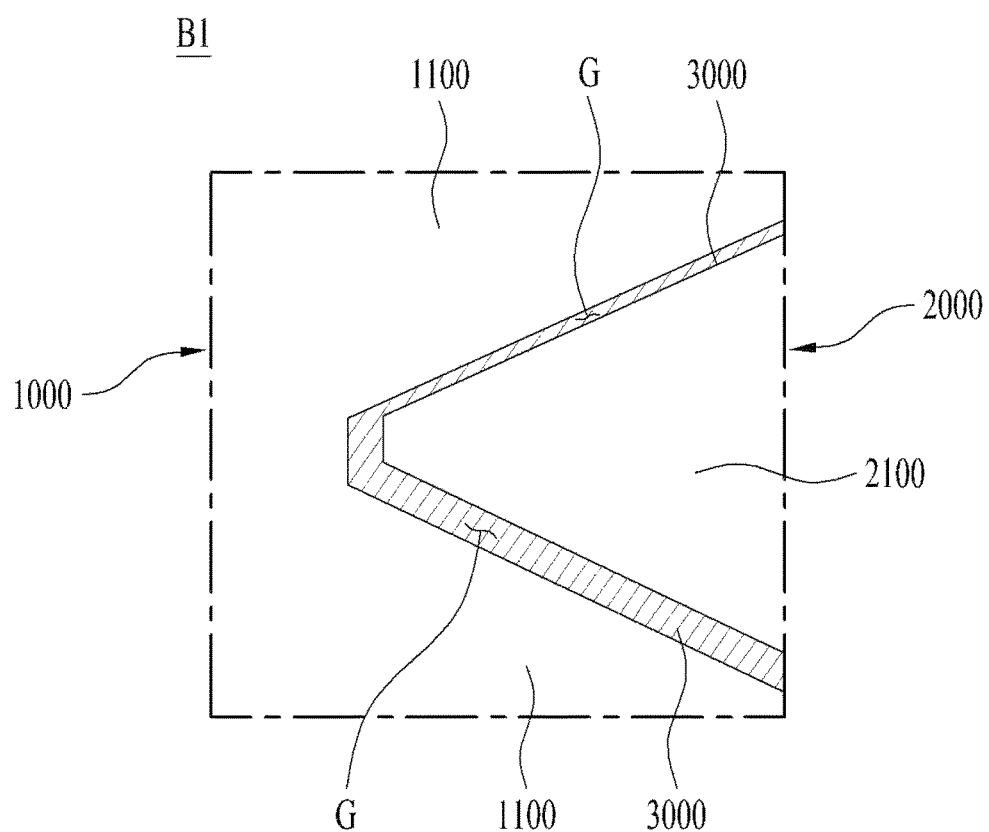
FIG. 10 is an enlarged view illustrating portion B1 of FIG. 9.

FIG. 10 is an enlarged view illustrating portion B1 of FIG. 9. FIG. 10 illustrates the state in which the lens barrel 1000 and the lens holder 2000 are attached to each other using the adhesive 3000 containing no filler applied thereto, unlike the embodiment.

With an adhesion method in which the adhesive 3000 containing no filler is applied to the surfaces of the first screw-thread 1100 and the second screw-thread 2100 so that the gap G is filled with the adhesive, as illustrated in FIG. 10, the lens barrel 1000 may move downward in the optical-axis direction.

That is, the lens barrel 1000 may be disposed at a position moved further downward than the designed position thereof in the optical-axis direction, and the reason therefor is as follows. After the adhesive 3000 is applied to the surfaces of the first screw-thread 1100 and the second screw-thread 2100, the adhesive 3000 may undergo shrinkage due to curing while the adhesive 3000 is cured.

Due to the shrinkage of the adhesive 3000, the thickness of the adhesive 3000 disposed in the gap G may be reduced, and due to this, the width L of the gap G filled with the adhesive 3000 may be reduced.

In addition, when the weight of the lens barrel 1000 acts before the adhesive 3000 is cured, as illustrated in FIG. 10, the width L of the gap G in the area in which the first screw-thread 1100 applies pressure to the second screw-thread 2100 due to the weight of the lens barrel 1000 may be reduced, and the width L of the gap in the area in which the first screw-thread 1100 applies no pressure to the second screw-thread 2100 may be increased.

Due to the above-described reason, that is, due to the curing shrinkage of the adhesive 3000 or the weight of the lens barrel 1000, the lens barrel 1000 may be placed at a position moved further downward than the designed position thereof in the optical-axis direction when the adhesive 3000 disposed in the gap G is completely cured.

Such deviation of the lens barrel 1000 from the designed position thereof may cause the following problem. An image sensor (not illustrated) may be provided under the lens 20 so as to face the lens 20 and to be spaced apart from the lens in the optical-axis direction.

The focal length between the lens 20 and the image sensor is determined depending on design specifications, and the distance between the lens 20 and the image sensor is also determined depending on the focal length.

Therefore, when the lens barrel 1000 is disposed outside the designed position, the distance between the lens 20 and the image sensor deviates from the designed value thereof, and accordingly, the focal length between the lens 20 and the image sensor deviates from the designed value thereof.

When the focal length deviates from the designed value, the quality of an image formed on the image sensor is deteriorated, and accordingly, needless to say, the quality of an image photographed by the camera module is also deteriorated.

Therefore, the focal length needs to fall within an allowable error range so as not to deviate from the designed value thereof. In the embodiment, it is possible to inhibit the focal length from deviating from the designed value by remarkably reducing the distance along which the lens barrel 1000 is moved downward in the optical-axis direction after the adhesive 3000 is completely cured.

Hereinafter, according to the embodiment, a structure and a method capable of remarkably reducing the distance along which the lens barrel 1000 is moved downward in the optical-axis direction due to the curing shrinkage of the adhesive 3000 or the weight of the lens barrel 1000 will be described in detail with reference to FIG. 11.

FIG. 11 is an enlarged view illustrating portion B1 of FIG. 9. FIG. 11 illustrates the state in which the lens barrel 1000 and the lens holder 2000 are attached to each other using the adhesive 3000 containing a filler 3100 applied thereto according to the embodiment.

In the embodiment, the adhesive 3000, which is disposed in the gap G between the first screw-thread 1100 and the second screw-thread 2100, may contain the filler 3100. Thus, the lens barrel 1000 and the lens holder 2000 may be attached to each other by the adhesive 3000 containing the filler 3100.

Here, the adhesive 3000 may include, for example, a thermosetting adhesive 3000. In addition, the adhesive 3000 may be, for example, an epoxy material.

It may be appropriate for the filler 3100 to be formed of a material that has heat resistance so as not to melt at a certain high temperature, in order to ensure that the filler 3100 exists in a solid state at room temperature and may also exist in a solid state even when it is heated for the curing of the adhesive 3000.

Therefore, it may be appropriate for the filler 3100 to be formed of, for example, at least one of $SiO_2$, $CaCO_3$, or $Al(OH)_3$. Here, needless to say, the filler 3100 may use a mixture of the aforementioned materials.

The filler 3100 may have at least one of an irregular shape, a spherical shape, or an ellipsoidal shape. Here, the term "ellipsoidal shape" means a three-dimensional shape, of which a plane cut by the plane passing through the center has an elliptical shape. Here, needless to say, the filler 3100 may have a shape that is a combination of the aforementioned shapes.

However, the use of the filler 3100 having a spherical shape or an ellipsoidal shape may be more effective than the use of the filler 3100 having an irregular shape. The reason therefor will be described below in detail.

The filler 3100 may be contained in the adhesive 3000 to thereby be inserted, along with the adhesive 3000, into the gap G. When the adhesive 3000 is cured, the filler 3100 may remarkably reduce the distance along which the lens barrel 1000 is moved downward in the optical-axis direction due to the curing shrinkage of the adhesive 3000 or the weight of the lens barrel 1000.

This is because the filler 3100 may serve to support the area in which the width L of the gap G is reduced due to the curing shrinkage of the adhesive 3000 or the weight of the lens barrel 1000, thereby inhibiting the width L of the gap G from being greatly reduced.

That is, the filler 3100 may serve to restrict a displacement caused when the lens barrel 1000 is moved in the optical-axis direction due to the curing shrinkage of the adhesive 3000 or the weight of the lens barrel 1000 when the adhesive 3000 is cured.

Meanwhile, the lens barrel 1000 or the lens holder 2000 may be formed of a non-metal material such as a plastic, but may be formed of a metal material in consideration of durability or the like.

In the case of a non-metal material, when the lens barrel 1000 and the lens holder 2000 including the first screw-thread 1100 and the second screw-thread 2100 are manufactured via injection molding, the width L of the gap G may be accurately adjusted. Therefore, when the adhesive 3000 is cured, the displacement of the lens barrel 1000 in the optical-axis direction may be adjusted to fall within an error range that is allowed by design.

However, since a metal material is difficult to injection mold, the first screw-thread 1100 and the second screw-thread 2100 are formed using a processing tool. Here, when the first screw-thread 1100 and the second screw-thread 2100 are successively and repeatedly formed, wear of the processing tool may occur.

Due to the wear of the processing tool, since it is difficult to accurately adjust the width L of the gap G when the first screw-thread 1100 and the second screw-thread 2100 are formed, it is difficult to adjust the displacement of the lens barrel 1000 in the optical-axis direction so as to fall within an error range that is allowed by design when the adhesive 3000 is cured.

Therefore, in the embodiment, the use of the adhesive 3000 containing the filler 3100 when the lens barrel 1000 and the lens holder 2000 are attached to each other is more effective in the case in which the lens barrel 1000 or the lens holder 2000 is formed of a metal material.

The following Table 1 illustrates the suitability of assembly based on the results of an experiment performed by changing the specifications of the filler 3100, that is, the longest length of the filler 3100, the shape of the filler 3100, and the mass ratio of the filler 3100 to the adhesive 3000. Here, the width L of the gap G is about 33 µm.

TABLE 1

| Filler Specification | Sample 1 | Sample 2 | Sample 3 | Sample 4 | Sample 5 | Sample 6 |
|---|---|---|---|---|---|---|
| Longest Lengthen(μm) | 1.7 to 2.1 | 9 to 12 | 17 | 17 | 25 | 30 |
| Shape | Irregular Shape | Irregular Shape | Irregular Shape | Irregular Shape | Spherical shape | Spherical Shape |
| Mass Ratio (%) to Adhesive 3000 | 20 | 45.1 | 30 | 15 | 15 | 15 |
| Assembly | Good | Good | Poor | Poor | Good | Good |

Here, the longest length of the filler 3100 may mean the longest length among the measured lengths of the filler 3100 when the filler has an irregular shape, and may mean the diameter when the filler has a spherical shape. The longest length of the filler 3100 may be obtained by irradiating each filler 3100 with light and measuring the scattered form of the light incident on the filler 3100.

In addition, that assembly is good means that, when the lens barrel 1000 or the lens holder 2000 is rotated so that the lens barrel 1000 is disposed at the designed position thereof in the optical-axis direction, it is not necessary to change a torque, applied to the lens barrel 1000 or the lens holder 2000 for assembly thereof, due to friction between the filler 3100 and the surface of the first screw-thread 1100 or the second screw-thread 2100.

That is, it can be seen that assembly is good so long as a torque value required for assembly is not excessively increased due to the frictional force generated between the filler 3100 and the first screw-thread 1100 or the second screw-thread 2100.

Based on experimental results, since the fillers 3100 having the specifications of Sample 3 and Sample 4 causes poor assembly, it may be more appropriate to select the fillers 3100 having the specifications of Sample 1, Sample 2, Sample 5, and Sample 6.

The following Table 2 illustrates the results of an experiment in which the displacement of the lens barrel 1000 in the optical-axis direction was measured after the adhesive 3000 was cured when using the fillers 3100 having the specifications of Sample 1, Sample 2, and Sample 5. Here, since it is difficult to directly measure the displacement of the lens barrel 1000 in the optical-axis direction, a modulation transfer function (MTF) value was measured.

The MTF value is a measured value of the contrast and the resolution of the lens 20, and is indicated as a ratio relative to a reference value. Thus, the MTF value is indicated as a dimensionless positive (+) numerical value, and the maximum value thereof is 1. In the embodiment, the greater MTF value means the greater displacement of the lens barrel 1000 in the optical-axis direction. In the experimental results, the MTF value was measured multiple times, and the average value, the maximum value, and the minimum value thereof are illustrated.

TABLE 2

| MTF Value | Sample 1 | Sample 2 | Sample 3 |
|---|---|---|---|
| Average Value | 0.053 | 0.050 | 0.039 |
| Maximum Value | 0.132 | 0.156 | 0.058 |
| Minimum Value | 0.018 | 0.012 | 0.011 |

Based on experimental results, it can be seen that the MTF value when using the filler 3100 having the specification of Sample 5 is smaller than those in the cases of Sample 1 and Sample 2. That is, it can be seen that the displacement of the lens barrel 1000 in the optical-axis direction after the adhesive 3000 is cured when using the filler 3100 having the specification of Sample 5 is smaller than those in the cases of Sample 1 and Sample 2.

Meanwhile, since the longest length in the case of Sample 6 is greater than that in the case of Sample 5, although no experimental results are proposed, it is clearly expected that the MTF value when using the filler 3100 having the specification of Sample 6 is smaller than those in the cases of Sample 1 and Sample 2. That is, it can be appreciated that the displacement of the lens barrel 1000 in the optical-axis direction after the adhesive 3000 is cured when using the filler 3100 having the specification of Sample 6 is smaller than those in the cases of Sample 1 and Sample 2.

In consideration of the above-described experimental results, the range within which assembly is good and the displacement of the lens barrel 1000 in the optical-axis direction after the adhesive 3000 is cured is remarkably small is as follows.

First, the width L of the gap G may be set to a range from 18 μm to 48 μm. More particularly, the width L of the gap G may be set to about 30 μm.

It may be appropriate for the filler 3100 to have a spherical shape. Meanwhile, in the same manner as the spherical filler 3100, the filler 3100 having an ellipsoidal shape may cause smaller frictional force with the first screw-thread 1100 or the second screw-thread 2100, thus achieving good assembly, compared to a filler having an irregular shape.

In addition, it is clearly expected that the filler 3100 having an ellipsoidal shape is similar in shape to the spherical filler 3100, and therefore may exhibit characteristics similar to those of the spherical filler 3100. Accordingly, the filler 3100 having an ellipsoidal shape may be appropriate.

In addition, it may be appropriate for the longest length of the filler 3100 to be set to a range from 65% to 95% of the width L of the gap G. When the longest length of the filler 3100 is smaller than 65% of the width L of the gap G, the displacement of the lens barrel 1000 in the optical-axis direction may be increased. When the longest length of the filler 3100 is greater than 95% of the width L of the gap G, assembly may become poor.

Here, when the filler 3100 has a spherical shape, it may be appropriate for the diameter of the filler 3100 to be set to a range from 75% to 92% of the width L of the gap G.

In addition, it may be appropriate for the filler 3100 to be set to have a mass ratio within a range from 10% to 30% of the adhesive 3000. More particularly, the filler 3100 may be set to have a mass ratio of 15% of that of the adhesive 3000.

In the embodiment, when the lens barrel 1000 and the lens holder 2000 are attached to each other using the adhesive 3000 containing the filler 3100, it is possible to remarkably reduce the magnitude of a displacement by which the lens barrel 1000 is moved downward in the optical-axis direction than the designed position thereof due to the curing shrinkage of the adhesive 3000 or the weight of the lens barrel 1000.

By remarkably reducing the magnitude of the displacement, the focal length between the lens 20 and the image sensor may be maintained very similar to the designed value thereof, and therefore, it is possible to achieve an improvement in the performance of the camera module, such as an increase in the resolution of an image of a subject to be photographed.

Although several embodiments have been described above, various other embodiments may be implemented. The technical ideas of the embodiments described above may be combined with each other in various forms so long as they are compatible, and new embodiments may be realized therefrom.

INDUSTRIAL APPLICABILITY

In the embodiments, by inhibiting an adhesive from flowing into a lens holder and an accommodating unit using a first protrusion, it is possible to inhibit contamination of a printed circuit board, various elements, and an image sensor provided in the accommodating unit. Thereby, it is possible to inhibit or remarkably reduce deterioration in the performance of a camera module due to contamination. Thus, the embodiments have industrial applicability.

The invention claimed is:

1. A camera module comprising;
a lens barrel comprising at least one lens; and
a lens holder coupled to the lens barrel,
wherein the lens barrel is formed with a first adhesive portion comprising a bottom surface facing a top surface of the lens holder and attached to the lens holder, and the lens holder is formed with a second adhesive portion comprising a top surface facing a bottom surface of the lens barrel and attached to the lens barrel,
wherein the second adhesive portion is formed with a first protrusion, and
wherein the first protrusion is spaced apart from an inner circumference of the second adhesive portion by a predetermined distance.

2. The camera module according to claim 1, wherein the second adhesive portion is formed with a first recess, to which at least a portion of an adhesive is applied.

3. The camera module according to claim 2, wherein the first protrusion is spaced apart from the first recess in a direction orthogonal to a first direction and protrudes in the first direction.

4. The camera module according to claim 3, wherein the second adhesive portion has a ring shape when viewed in the first direction, and the first recess is formed in a ring shape in a circumferential direction of the second adhesive portion.

5. The camera module according to claim 4, wherein a width of the first recess is greater than a depth of the first recess.

6. The camera module according to claim 5, wherein the depth of the first recess is half of the width of the first recess.

7. The camera module according to claim 4, wherein the second adhesive portion is formed such that a height of an outer surface thereof that is present outside the first recess is lower than a height of an inner surface thereof that is present inside the first recess.

8. The camera module according to claim 3, wherein the first adhesive portion has a ring shape when viewed in the first direction, and is formed in an inner area thereof with a second recess having a ring shape when viewed in the first direction.

9. The camera module according to claim 8, wherein the first protrusion and the second recess are provided so as to face each other in the first direction, and wherein a space is provided between the first protrusion and the second recess so as to inhibit the lens holder from interfering with the lens barrel.

10. The camera module according to claim 7, wherein the first protrusion is formed in an inner area of the second adhesive portion at a position corresponding to half of a width of the second adhesive portion.

11. A camera module comprising:
a lens barrel comprising at least one lens; and
a lens holder coupled to the lens barrel,
wherein the lens barrel is formed with a first adhesive portion comprising a bottom surface facing a top surface of the lens holder and attached to the lens holder, and the lens holder is formed with a second adhesive portion comprising a top surface facing a bottom surface of the lens barrel and attached to the lens barrel,
wherein the second adhesive portion is formed thereon with a first protrusion, and the first protrusion protrudes in a first direction, and
wherein the second adhesive portion has a ring shape when viewed in the first direction.

12. The camera module according to claim 11, wherein the first protrusion is spaced apart from an inner circumference of the second adhesive portion by a predetermined distance.

13. The camera module according to claim 11, wherein the second adhesive portion is formed with a first recess, to which at least a portion of an adhesive is applied.

14. The camera module according to claim 13, wherein the first adhesive portion has a ring shape when viewed in the first direction, and is formed in an inner area thereof with a second recess having a ring shape when viewed in the first direction.

15. The camera module according to claim 13, wherein the first protrusion and the second recess are provided so as to face each other in the first direction, and wherein a space is provided between the first protrusion and the second recess so as to inhibit the lens holder from interfering with the lens barrel.

16. The camera module according to claim 14, wherein the first recess is formed in a ring shape in a circumferential direction of the second adhesive portion.

17. The camera module according to claim 14, wherein a width of the first recess is greater than a depth of the first recess.

18. The camera module according to claim 17, wherein the depth of the first recess is half of the width of the first recess.

19. The camera module according to claim 18, wherein the second adhesive portion is formed such that a height of an outer surface thereof that is present outside the first recess is lower than a height of an inner surface thereof that is present inside the first recess.

20. A camera module comprising;
a lens barrel comprising at least one lens; and
a lens holder coupled to the lens barrel,
wherein the lens barrel is formed with a first adhesive portion comprising a bottom surface facing a top surface of the lens holder and attached to the lens holder, and the lens holder is formed with a second adhesive portion comprising a top surface facing a bottom surface of the lens barrel and attached to the lens barrel,
wherein the first adhesive portion has a ring shape when viewed in a first direction, and is formed in an inner area thereof with a second recess having a ring shape when viewed in the first direction, wherein the second adhesive portion is formed thereon with a first protrusion, and the first protrusion protrudes in the first direction.

\* \* \* \* \*